(12) United States Patent
Elzey et al.

(10) Patent No.: US 7,288,326 B2
(45) Date of Patent: Oct. 30, 2007

(54) ACTIVE ENERGY ABSORBING CELLULAR METALS AND METHOD OF MANUFACTURING AND USING THE SAME

(75) Inventors: Dana M. Elzey, Charlottesville, VA (US); Haydn N. G. Wadley, Keswick, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 235 days.

(21) Appl. No.: 10/516,052

(22) PCT Filed: May 30, 2003

(86) PCT No.: PCT/US03/17049

§ 371 (c)(1),
(2), (4) Date: Nov. 29, 2004

(87) PCT Pub. No.: WO03/101722

PCT Pub. Date: Dec. 11, 2003

(65) Prior Publication Data

US 2005/0158573 A1    Jul. 21, 2005

Related U.S. Application Data

(60) Provisional application No. 60/384,159, filed on May 30, 2002.

(51) Int. Cl.
*B32B 3/18* (2006.01)
*B32B 3/30* (2006.01)

(52) U.S. Cl. .................. 428/593; 428/594; 428/598; 428/603; 428/604; 428/179; 52/790.1; 52/783.1

(58) Field of Classification Search .............. None
See application file for complete search history.

(56) References Cited

U.S. PATENT DOCUMENTS 1,154,254 A    9/1915    Lachman
(Continued)

FOREIGN PATENT DOCUMENTS

JP    1147294    6/1989
(Continued)

OTHER PUBLICATIONS

Wadley, "Manufacture of Cellular Metals: An Overview of Concepts for Stochastic and Periodic Materials," MetFoam 2001, (Jun. 18, 2001).

(Continued)

*Primary Examiner*—John J. Zimmerman
(74) *Attorney, Agent, or Firm*—Robert J. Decker

(57) ABSTRACT

Multifunctional cellular metals (or other materials) for structural applications that are capable of recovering their original (undeformed) shape and thickness after impact or crushing (i.e., self-healing). Alternatively, they may normally be stored or used in their compressed (i.e., crushed) state and deployed when needed to act as energy absorbing structure or packaging (i.e., deployable energy absorber). Additionally, the multifunctional structures may act as an actuator, capable of providing localized or distributed force and displacement, and related methods of using and manufacturing the same. These active cellular metals (or other materials) are composites consisting of conventional metal/alloy truss structures (or other material structures) in combination with shape memory metal/alloy components (or other material components) and offer high specific strength and stiffness, but which are also deployable energy absorbers or self-healing smart structures.

41 Claims, 6 Drawing Sheets

U.S. PATENT DOCUMENTS

| | | |
|---|---|---|
| 2,288,104 A | 6/1942 | Pasquier |
| 2,481,046 A | 9/1949 | Scurlock |
| 2,789,076 A | 4/1957 | Frieder |
| 3,298,402 A | 1/1967 | Hale |
| 3,783,969 A | 1/1974 | Pall |
| 3,795,288 A | 3/1974 | Pall |
| 3,857,217 A | 12/1974 | Reps |
| 3,869,778 A | 3/1975 | Yancey |
| 3,971,072 A | 7/1976 | Armellino |
| 3,996,082 A | 12/1976 | Leatherman |
| 4,001,478 A | 1/1977 | King |
| 4,019,540 A | 4/1977 | Holman |
| 4,027,476 A | 6/1977 | Schmidt |
| 4,037,751 A | 7/1977 | Miller |
| 4,038,440 A | 7/1977 | King |
| 4,067,956 A | 1/1978 | Franklin |
| 4,129,089 A | 12/1978 | Paidoussis |
| 4,130,233 A | 12/1978 | Chisholm |
| 4,194,255 A | 3/1980 | Poppe |
| 4,223,053 A | 9/1980 | Brogan |
| 4,291,732 A | 9/1981 | Artzer |
| 4,450,338 A | 5/1984 | Conn |
| 4,453,367 A | 6/1984 | Geyer |
| 4,469,077 A | 9/1984 | Wooldridge |
| 4,518,444 A | 5/1985 | Albrecht |
| 4,522,860 A | 6/1985 | Scott |
| 4,529,640 A | 7/1985 | Brown |
| 4,530,197 A | 7/1985 | Rainville |
| 4,531,511 A | 7/1985 | Hochberg |
| 4,625,710 A | 12/1986 | Harada |
| 4,632,716 A | 12/1986 | Smith |
| 4,639,388 A | 1/1987 | Ainsworth |
| 4,687,702 A | 8/1987 | Monsees |
| 4,756,943 A | 7/1988 | Koletzko |
| 4,758,299 A | 7/1988 | Burke |
| 4,765,396 A | 8/1988 | Seidenberg |
| 4,806,815 A | 2/1989 | Honma |
| 4,819,719 A | 4/1989 | Grote |
| 4,859,541 A | 8/1989 | Maxeiner |
| 4,864,824 A | 9/1989 | Gabriel |
| 4,881,981 A | 11/1989 | Thomas |
| 4,883,116 A | 11/1989 | Seidenberg |
| 4,916,027 A | 4/1990 | Delmundo |
| 4,918,281 A | 4/1990 | Blair |
| 4,923,544 A | 5/1990 | Weisse |
| 4,955,135 A | 9/1990 | Pinkhasov |
| 4,968,367 A | 11/1990 | Diderich |
| 5,002,378 A | 3/1991 | Colarusso |
| 5,011,638 A | 4/1991 | Pinkhasov |
| 5,040,966 A | 8/1991 | Weisse |
| 5,070,673 A | 12/1991 | Weisse |
| 5,102,723 A | 4/1992 | Pepin |
| 5,110,661 A | 5/1992 | Groves |
| 5,137,058 A | 8/1992 | Anahara |
| 5,176,641 A | 1/1993 | Idriss |
| 5,179,043 A | 1/1993 | Weichold |
| 5,181,549 A | 1/1993 | Shapovalov |
| 5,190,539 A | 3/1993 | Fletcher |
| 5,217,770 A | 6/1993 | Morris |
| 5,219,020 A | 6/1993 | Akachi |
| 5,224,519 A | 7/1993 | Farley |
| 5,242,321 A | 9/1993 | Gil |
| 5,266,279 A | 11/1993 | Haerle |
| 5,282,861 A | 2/1994 | Kaplan |
| 5,308,669 A | 5/1994 | Prucher |
| 5,309,457 A | 5/1994 | Minch |
| 5,312,660 A | 5/1994 | Morris |
| 5,349,893 A | 9/1994 | Dunn |
| 5,360,500 A | 11/1994 | Evans |
| 5,401,583 A | 3/1995 | Stacher |
| 5,405,337 A | 4/1995 | Maynard |
| 5,417,686 A | 5/1995 | Peterson |
| 5,419,788 A | 5/1995 | Thomas |
| 5,424,139 A | 6/1995 | Shuler |
| 5,431,800 A | 7/1995 | Kirchhoff |
| 5,442,914 A | 8/1995 | Otsuka |
| 5,455,096 A | 10/1995 | Toni |
| 5,465,760 A | 11/1995 | Mohamed |
| 5,471,905 A | 12/1995 | Martin |
| 5,472,769 A | 12/1995 | Goerz |
| 5,503,887 A | 4/1996 | Diaz |
| 5,511,974 A | 4/1996 | Gordon |
| 5,527,588 A | 6/1996 | Camarda |
| 5,527,590 A | 6/1996 | Priluck |
| 5,534,314 A | 7/1996 | Wadley |
| 5,536,126 A | 7/1996 | Gross |
| 5,547,737 A | 8/1996 | Evans |
| 5,558,304 A | 9/1996 | Adams |
| 5,591,162 A | 1/1997 | Fletcher |
| 5,594,330 A | 1/1997 | Jacobsen |
| 5,597,378 A | 1/1997 | Jervis |
| 5,598,632 A | 2/1997 | Camarda |
| 5,605,628 A | 2/1997 | Davidson |
| 5,624,622 A | 4/1997 | Boyce |
| 5,641,955 A | 6/1997 | Bonniau |
| 5,642,776 A | 7/1997 | Meyer |
| 5,654,518 A | 8/1997 | Dobbs |
| 5,656,984 A | 8/1997 | Paradis |
| 5,662,294 A | 9/1997 | Maclean |
| 5,673,561 A | 10/1997 | Moss |
| 5,677,029 A | 10/1997 | Prevorsek |
| 5,679,467 A | 10/1997 | Priluck |
| 5,698,282 A | 12/1997 | DeMeyer |
| 5,700,337 A | 12/1997 | Jacobs |
| 5,727,391 A * | 3/1998 | Hayward et al. ............. 60/528 |
| 5,741,574 A | 4/1998 | Boyce |
| 5,746,631 A | 5/1998 | McCarthy |
| 5,771,488 A | 6/1998 | Honkala |
| 5,772,821 A | 6/1998 | Yasui |
| 5,773,121 A | 6/1998 | Meteer |
| 5,804,276 A | 9/1998 | Jacobs |
| 5,808,866 A | 9/1998 | Porter |
| 5,817,391 A | 10/1998 | Rock |
| 5,882,444 A | 3/1999 | Flomenblit |
| 5,888,609 A | 3/1999 | Karttunen |
| 5,888,912 A | 3/1999 | Piemonte |
| 5,890,268 A | 4/1999 | Mullen |
| 5,924,459 A | 7/1999 | Evans |
| 5,931,422 A | 8/1999 | Geiger |
| 5,934,952 A | 8/1999 | Scanlon |
| 5,941,249 A | 8/1999 | Maynard |
| 5,943,543 A | 8/1999 | Uchida |
| 5,962,150 A | 10/1999 | Priluck |
| 5,964,770 A | 10/1999 | Flomenblit |
| 5,970,843 A | 10/1999 | Strasser |
| 5,972,146 A | 10/1999 | Fantino |
| 5,972,468 A | 10/1999 | Welch |
| 6,003,591 A | 12/1999 | Campbell |
| 6,004,330 A | 12/1999 | Middleman |
| 6,055,123 A | 4/2000 | Kazmierczak |
| 6,065,934 A | 5/2000 | Jacot |
| 6,076,324 A | 6/2000 | Daily |
| 6,077,370 A | 6/2000 | Solvstev |
| 6,080,495 A | 6/2000 | Wright |
| 6,082,443 A | 7/2000 | Yamamoto |
| 6,084,849 A | 7/2000 | Durig |
| 6,126,371 A | 10/2000 | McCloskey |
| 6,131,531 A | 10/2000 | McCanna |
| 6,133,547 A | 10/2000 | Maynard |
| 6,138,604 A | 10/2000 | Anderson |
| 6,146,224 A | 11/2000 | McCarthy |
| 6,149,742 A | 11/2000 | Carpenter |
| 6,170,202 B1 | 1/2001 | Davoodi |
| 6,170,560 B1 | 1/2001 | Daily |

| | | |
|---|---|---|
| 6,175,495 B1 | 1/2001 | Batchelder |
| 6,176,964 B1 | 1/2001 | Parente |
| 6,182,929 B1 | 2/2001 | Martin |
| 6,189,286 B1 | 2/2001 | Seible |
| 6,200,664 B1 | 3/2001 | Figge |
| 6,204,200 B1 | 3/2001 | Shieh |
| 6,207,256 B1 | 3/2001 | Tashiro |
| 6,209,824 B1 | 4/2001 | Caton |
| 6,217,567 B1 | 4/2001 | Zadno-Azizi |
| 6,220,550 B1 | 4/2001 | McKillip |
| 6,228,744 B1 | 5/2001 | Levine |
| 6,258,118 B1 | 7/2001 | Baum |
| 6,260,567 B1 | 7/2001 | Gruensfelder |
| 6,278,084 B1 | 8/2001 | Maynard |
| 6,284,346 B1 | 9/2001 | Sheridan |
| 6,293,090 B1 | 9/2001 | Olson |
| 6,299,613 B1 | 10/2001 | Ogilvie |
| 6,306,141 B1 | 10/2001 | Jervis |
| 6,318,070 B1 | 11/2001 | Rey |
| 6,345,792 B2 | 2/2002 | Bilanin |
| 6,348,067 B1 | 2/2002 | Baum |
| 6,371,821 B1 | 4/2002 | McCarthy |
| 6,384,707 B2 | 5/2002 | Minners |
| 6,395,018 B1 | 5/2002 | Castaneda |
| 6,402,906 B1 | 6/2002 | Pichulo |
| 6,409,749 B1 | 6/2002 | Maynard |
| 6,417,597 B1 | 7/2002 | Baker, Jr. |
| 6,419,358 B1 | 7/2002 | Schetky |
| 6,422,010 B1 | 7/2002 | Julien |
| 6,425,343 B1 | 7/2002 | Akers |
| 6,425,829 B1 | 7/2002 | Julien |
| 6,427,712 B1 | 8/2002 | Ashurst |
| 6,427,948 B1 | 8/2002 | Campbell |
| 6,432,134 B1 | 8/2002 | Anson |
| 6,447,478 B1 * | 9/2002 | Maynard ............ 604/95.05 |
| 6,530,564 B1 * | 3/2003 | Julien .................... 267/147 |
| 6,579,811 B2 | 6/2003 | Narwankar |
| 6,644,535 B2 | 11/2003 | Wallach |
| 6,676,797 B2 | 1/2004 | Tippett |
| 6,684,943 B2 | 2/2004 | Dobbs |
| 6,739,104 B2 | 5/2004 | Tokonabe |
| 6,740,381 B2 | 5/2004 | Day |
| 7,211,348 B2 | 5/2007 | Wadley |
| 2004/0154252 A1 * | 8/2004 | Sypeck et al. ........... 52/506.01 |
| 2004/0197519 A1 * | 10/2004 | Elzey et al. ................ 428/68 |
| 2005/0217767 A1 * | 10/2005 | Barvosa-Carter et al. ... 148/563 |
| 2006/0020324 A1 * | 1/2006 | Schmid et al. ............ 623/1.16 |
| 2006/0163319 A1 * | 7/2006 | Ervin et al. ................ 228/101 |
| 2006/0202492 A1 * | 9/2006 | Barvosa-Carter et al. ... 293/107 |
| 2006/0286342 A1 * | 12/2006 | Elzey ....................... 428/131 |

FOREIGN PATENT DOCUMENTS

| | | | |
|---|---|---|---|
| JP | 04-076274 | * | 3/1992 |
| JP | 07-942893 | * | 2/1995 |
| RU | 1773999 A1 | * | 11/1992 |
| WO | WO 227116 | | 4/2002 |
| WO | WO 03/018853 A2 | * | 3/2003 |

OTHER PUBLICATIONS

Unknown, "DUOCEL Foam Metal for Semiconductor Applications," ERG Materials and Aerospace Corporation website.

Unknown, ERG Materials and Aerospace Corporation website.

Unknown, "Reticulated Vitreous Carbon," ERG Materials and Aerospace Corporation website.

Unknown, "Properties of DUOCEL Silicon Carbide Foams," ERG Materials and Aerospace Corporation website.

Boomsma, "Metal Foams for Compact High Performance Heat Exchangers," Laboratory of Thermodynamics in Emerging Technologies, website 2001.

Gibson, "Metallic Foams: Structure, Properties and Applications," ICTAM 2000, (Aug. 28, 2000).

Unknown, "Directed Vapor Deposition of Ultralightweight Metal Foams," UVA website.

Unknown, "Micro Heat Exchangers," Institut for Mikrotechnik Mainz GmbH, (Feb. 1, 1998).

Naanes, "Grant funds University heat-exchanger project," The Reveille, Louisiana State University, (Nov. 9, 1999).

Unknown, "Solid Sorption Machines with Heat Pipe Heat Exchangers for Heat Transfer Enhancement and Thermal Control," U.S. Civilian Research & Development Foundation website, Abstract #BE1-107.

Itoh, "Itoh's Micro Heat Pipe Home Page," Itoh's website.

Unknown, "A High Performance Heat Sink Using Micro Heat-Pipes Now Available at Low Price," Furukawa Electric website, (Jan. 25, 2000).

Unknown, "The Application of Micro-Heat-Pipe in a Portable Electronic System," Industrial Technology Research Institute, vol. 7 (Winter), (1996).

Unknown, "Thermal Management—Heat Pipes," Fujikura Europe Limited website, United Kingdom.

Unknown, "Thermal Management—Heat Sinks," Fujikura Europe Limited website, United Kingdom.

Queheillalt, et al., "Electron beam—directed vapor deposition of multifunctional structures," Mat. Res. Soc. Symp. Proc., vol. 672, (Nov. 12, 2001).

Seok Hwan Moon, et al., "Experimental study on the thermal performance of micro-heat pipe with cross-section of polygon," Microelectronics Reliability 44 (2004) 315-321, (Feb. 12, 2003).

Sypeck, "Multifunctional microtruss laminates: Textile synthesis and properties," Mat. Res. Soc. Symp. Proc. vol. 672 2001 Materials Research Society.

Evans, "Lightweight materials and structures," MRS Bulletin Oct. 2001.

L. J. Gibson, "Mechanical Behavior of Metallic Foams," Annu. Rev. Matter. Sci., p. 191-227, 2000.

Wadley, "Electron Beam - Directed Vapor Deposition of Superthermal Conducting Structures" Jun. 13-15, 2001 (this reference was previously submitted Jun. 25, 2007, but with incorrect title).

* cited by examiner

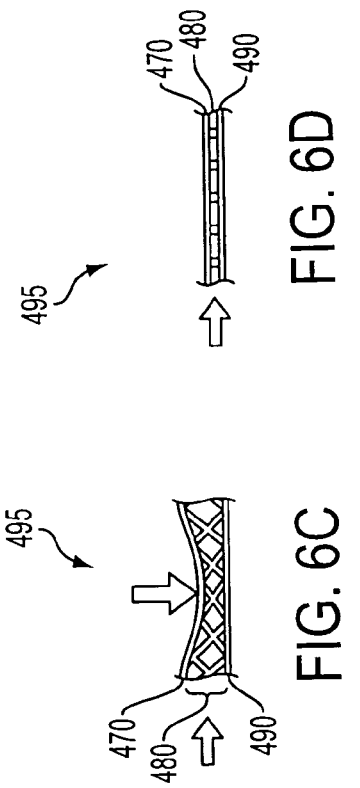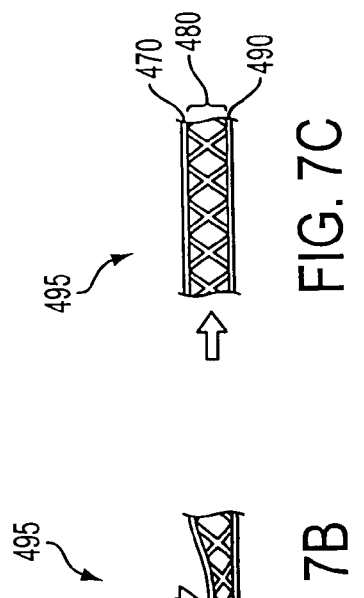
FIG. 6A FIG. 6B FIG. 6C FIG. 6D
FIG. 7A FIG. 7B FIG. 7C

ACTIVE ENERGY ABSORBING CELLULAR METALS AND METHOD OF MANUFACTURING AND USING THE SAME

RELATED APPLICATIONS

This application is a national stage filing of International Application No. PCT/US03/17049, filed on May 30, 2003, which claims benefit under 35 U.S.C. Section 119(e) from U.S. Provisional Application Ser. No. 60/384,159 filed on May 30, 2002, entitled "Active Energy Absorbing Cellular Metals and Method of Manufacturing the Same," the entire disclosures of which are hereby incorporated by reference herein-in their entirety.

FIELD OF INVENTION

The present invention relates generally to multifunctional cellular metals for structural applications that are capable of 1) recovering their original (undeformed) shape and thickness after impact or crushing (i.e., self-healing) 2) being stored or used in their compressed (i.e., crushed) state and deployed when needed to act as energy absorbing structure or packaging (i.e., deployable energy absorber) and/or 3) acting as an actuator, capable of providing localized or distributed force and displacement, and related methods of using and manufacturing the same.

BACKGROUND OF THE INVENTION

Foams and cellular materials are well established as energy absorbing materials. Styrofoam packaging for computer monitors during shipping, bubble wrap and cardboard are examples. Their energy absorbing capability arises from the deformation (bending, stretching, or buckling) of struts (if open-celled) or membrane walls (if closed-cell) [1]. Closed-cell foams may also rely upon compression of a gas contained within the cell to absorb impact energy.

Although the foamed and cellular materials we are most familiar with for packaging and energy absorption are practically all polymeric, recent developments have led to a variety of metallic counterparts. Metals and alloys are attractive in these applications owing to their much higher stiffness and strength, and the increased energy they can absorb by deforming plastically (e.g., by dislocation glide). Foamed aluminum alloy can now be produced by injecting air (e.g., Metal Foams: A Design Guide by Michael Ashby, Anthony Evans, Norman Fleck, Loma Gibson, John Hutchinson and Haydn Wadley, Butterworths, 2000) or a foaming agent (TiH2) into the liquid melt and solidifying the froth in a steep temperature gradient at the surface of the bath [2], or by a similar, semi-solid process [3]. These low-cost, high-volume processing routes strongly encouraged increased research into their performance, and the relation between (porous) structure and performance.

Recent developments by Sypeck and Wadley [4] have led to the development and demonstration of low-cost cellular metals based on woven wire truss structures and formed metal lattices. It is worthwhile to briefly describe both of these approaches/materials.

Woven wire truss core sandwich panels use a core consisting of lamina of woven wire sheets, which are stacked and bonded using brazing or liquid phase sintering. The lightweight (relative density below 10%) cores are then bonded to metallic face sheets, which may be of the same or a different alloy than the core. Compared to metal foam core panels, such cellular metal beams and panels have been shown to exhibit excellent specific stiffness and strength [5]. The formed metal lattice, or simply truss-core, material is produced by first punching a honeycomb-like array of hexagonal holes from a flat dense sheet of the desired metal or alloy (e.g. 304 stainless steel); specially-designed tooling (consisting of a pair of interpenetrating arrays of pins) is then used to deform the hex sheet into an array of tetrahedral. This is accomplished by pushing every second vertex (i.e., node at which three ligaments within the hex sheet come together) upwards, and at the same time, all other vertices in the opposite direction. The resulting truss-core sheets can then be stacked, either with intermediate sheets (or punched hex sheets), and bonded by brazing, sintering, etc.

The cellular metal structures based on woven-wire and truss-core approaches are attractive as structural materials because of their exceptional specific properties. However, they are perhaps even more promising as candidates for multifunctional materials applications. In addition to bearing forces and moments as an integral structural component, they will simultaneously be used as heat exchangers, filters, catalysts, batteries, energy absorbers, or actuators. Cellular metals are attractive as energy absorbers not only because they can double as structural members with high specific stiffness and strength. But also because plastic deformation of metals and alloys is an efficient energy absorption mechanism, such materials have very low Poisson ratio (they densify while crushing), and the threshold stress for crushing can be accurately controlled by the cellular morphology (size, shape of cells and of the struts and cell walls).

Recent work by Elzey et al. [6] has led to the development of active, shape-morphing structural components based on 2-D and 3-D truss-core structures combined with SMA elements (actuators). This design has been shown to provide the capability for fully reversible, shape-changing structures. Applications might include mission adaptable wings for aircraft, tunable rotors for helicopters and turbine generators, and deployable space structures. The SMA elements used currently are based on roughly equi-atomic NiTi, which can be induced to undergo a phase transformation from its martensite form (monoclinic crystal structure) to austenite (cubic crystal structure) either by increasing the temperature to above the austenite finish temperature ($A_f$), or by applying stress at temperatures below the temperature at which the austenite phase is stable. Deformations of up to 8% strain can be absorbed at low temperature (e.g. 20) by the formation of the martensite phase, and are completely recoverable upon heating to the $A_f$ temperature.

The present invention relates to, among other things, low-cost cellular metals (e.g. truss-core sandwich panel) and active structures to achieve active, cellular metal materials for use as deployable and reusable energy absorbers and self-healing structural members. The present invention provides low-cost precursors such as the truss-core lattice in combination with active (SMA) elements. The active elements will provide for energy absorption by inelastic deformation (like a conventional metal or alloy), but fully recoverable (like a polymer foam).

SUMMARY OF THE INVENTION

The present invention provides multifunctional cellular metals (or other materials) for structural applications that are capable of recovering their original (undeformed) shape and thickness after impact or crushing (i.e., self-healing). Alternatively, they may normally be stored or used in their compressed (i.e., crushed) state and deployed when needed to act as energy absorbing structure or packaging (i.e., deployable energy absorber). Additionally, present invention multifunctional structures may act as an actuator, capable of providing localized or distributed force and displacement, and related methods of using and manufacturing the same. These active cellular metals (or other materials) are composites consisting of conventional metal/alloy truss structures (or other material structures) in combination with shape memory metal/alloy components (or other material components) and offer high specific strength and stiffness, but which are also deployable energy absorbers or self-healing smart structures.

An aspect of an embodiment of the present invention provides a multifunctional member adapted for structural deformation and reformation. The multifunctional member comprising at least one active core member. The active core member adapted to deform if exposed to an external force and reform from a deformed state if exposed to a stimulant. The multifunctional member further comprising at least one upper member disposed on the core member. The upper member further comprises at least one protrusion, whereby the protrusions generally protrude in the direction of the active core member. The multifunctional member further comprising at least one lower member disposed on the core member opposite the upper member. The lower member further comprises at least one protrusion, whereby the protrusions generally protrude in the direction of the active core member.

At least some of said upper protrusions and lower protrusions are aligned relative to one another such they will interpenetrate when subject to the force. An aspect of an embodiment of the present invention provides a multifunctional member adapted for structural deformation and reformation. The multifunctional member comprising at least one active core member. The active cellular core member adapted to deform if exposed to an external force and reform from a deformed state if exposed to a stimulant. The multifunctional member further comprising at least one upper three-dimensional space filling layer disposed on the core member. The upper three-dimensional space filling layer comprises an array of out of plane truss units. The multifunctional member further comprising at least one lower three-dimensional space filling layer disposed on the active core member opposite the upper space filling layer. The lower three-dimensional space filling layer comprises an array of out of plane truss units. At least some of the upper and lower three-dimensional space filling layers are aligned relative to one another such that they will interpenetrate when subjected to the force.

An aspect of an embodiment of the present invention provides a multifunctional member adapted for structural deformation and reformation. The multifunctional member comprising at least one active core member. The active core member is adapted to deform in tension if exposed to an external force and reform from a deformed state if exposed to a stimulant. The multifunctional member further comprising at least one upper expandable layer that is disposed on the core member. The upper expandable layer comprising an array of expandable units. The upper expandable units having a base dimension as defined by the dimension substantially parallel to the active core member and a height dimension as defined by the dimension substantially perpendicular to the active core member. The multifunctional member further comprising at least one lower expandable layer disposed on the active core member opposite the upper space filling layer. The lower expandable layer comprises an array of expandable units. The lower expandable units having a base dimension as defined by the dimension substantially parallel to the active core member and a height dimension as defined by the dimension substantially perpendicular to the active core member. The upper and lower expandable layers are adapted whereby when subject to the force the height dimensions of at least some of the upper and lower expandable units decrease thereby deforming the active core member in tension.

An aspect of an embodiment of the present invention provides a multifunctional member adapted for structural deformation and reformation. The multifunctional member comprising at least one active core member. The active core member adapted to deform in tension if exposed to an external force and reform from a deformed state if exposed to a stimulant: The multifunctional member further comprising at least one upper three-dimensional space filling layer disposed on the core member. The upper three-dimensional space filling layer comprised of an array of out of plane truss units. The upper truss units having a base dimension as defined by the dimension substantially parallel to the active core member and a height dimension as defined by the dimension substantially perpendicular to the active core member. The multifunctional member further comprising at least one lower three-dimensional space filling layer disposed on the active core member opposite the upper space filling layer. The lower three-dimensional space filling layer comprises an array of out of plane truss units. The lower truss units having a base dimension as defined by the dimension substantially parallel to the active core member and a height dimension as defined by the dimension substantially perpendicular to the active core member. The upper and lower three-dimensional space filling layers are adapted whereby when subject to the force the height dimensions of at least some of the upper and lower truss units decrease thereby deforming the active core member in tension.

An aspect of an embodiment of the present invention provides a multifunctional member adapted for structural deformation and reformation. The multifunctional member comprising at least one active core member. The active core member adapted to deform if exposed to an external force and reform from a deformed state if exposed to a stimulant. The multifunctional member further comprising at least one upper exterior member disposed on the core member and at least one lower exterior member disposed on the core member opposite the upper exterior member.

An aspect of an embodiment of the present invention provides multifunctional member adapted for structural deformation and reformation. The multifunctional member comprising at least one active core member. The active core member adapted to deform if exposed to an external force and reform from a deformed state upon removal of the external force. The multifunctional member further comprising at least one upper member disposed on the core member. The upper member further comprises at least one protrusion, whereby the protrusions generally protrude in the direction of the active core member. The multifunctional member further comprising at least one lower member disposed on the core member opposite the upper member. The lower member further comprises at least one protrusion, whereby the protrusions generally protrude in the direction of the active core member. At least some of the upper protrusions and lower protrusions are aligned relative to one another such they will interpenetrate when subject to the force.

An aspect of an embodiment of the present invention provides a multifunctional member adapted for structural deformation and reformation. The multifunctional member comprising at least one active core member. The active cellular core member adapted to deform if exposed to an external force and reform from a deformed state upon removal of the external force. The multifunctional member further comprising at least one upper three-dimensional space filling layer disposed on the core member. The upper three-dimensional space filling layer comprises an array of out of plane truss units. The multifunctional member further comprising at least one lower three-dimensional space filling layer disposed on the active core member opposite the upper space filling layer. The lower three-dimensional space filling layer comprises an array of out of plane truss units. At least some of the upper and lower three-dimensional space filling layers are aligned relative to one another such that they will interpenetrate when subjected to the force.

An aspect of the present invention provides a multifunctional member adapted for structural deformation and reformation. The multifunctional member comprising at least one active core member. The active core member adapted to deform in tension if exposed to an external force and reform from a deformed state upon removal of the external force. The multifunctional member further comprising at least one upper expandable layer disposed on the core member. The upper expandable layer comprising an array of out of expandable units. The upper expandable units having a base dimension as defined by the dimension substantially parallel to the active core member and a height dimension as defined by the dimension substantially perpendicular to the active core member. The multifunctional member further comprising at least one lower expandable layer disposed on the active core member opposite the upper space filling layer. The lower expandable layer comprises an array of expandable units. The lower expandable units having a base dimension as defined by the dimension substantially parallel to the active core member and a height dimension as defined by the dimension substantially perpendicular to the active core member. The upper and lower expandable layers are adapted whereby when subject to the force the height dimensions of at least some of the upper and lower expandable units decrease thereby deforming the active core member in tension.

An aspect of an embodiment of the present invention provides a multifunctional member adapted for structural deformation and reformation. The multifunctional member comprising at least one active core member. The active core member adapted to deform in tension if exposed to an external force and reform from a deformed state upon removal of the external force. The multifunctional member further comprising at least one upper three-dimensional space filling layer disposed on the core member. The upper three-dimensional space filling layer comprises an array of out of plane truss units. The upper truss units having a base dimension as defined by the dimension substantially parallel to the active core member and a height dimension as defined by the dimension substantially perpendicular to the active core member. The multifunctional member further comprising at least one lower three-dimensional space filling layer disposed on the active core member opposite the upper space filling layer. The lower three-dimensional space filling layer comprised of an array of out of plane truss units. The lower truss units having a base dimension as defined by the dimension substantially parallel to the active core member and a height dimension as defined by the dimension substantially perpendicular to the active core member. The upper and lower three-dimensional space filling layers are adapted whereby when subject to the force the height dimensions of at least some of the upper and lower truss units decrease thereby deforming the active core member in tension.

An aspect of an embodiment of the present invention provides a multifunctional member adapted for structural deformation and reformation. The multifunctional member comprising at least one active core member. The active core member adapted to deform if exposed to an external force and reform from a deformed state upon removal of the external force. The multifunctional member further comprising at least one upper exterior member disposed on the core member and at least one lower exterior member disposed on the core member opposite the upper exterior member.

An aspect of an embodiment of the present invention provides a multifunctional member adapted for structural deformation and reformation. The multifunctional member comprising at least one active core member. The active core member adapted to deform if exposed to an external force and reform from a deformed state if exposed to a stimulant. The multifunctional member further comprising at least one upper exterior member disposed on the core member and at least one lower exterior member disposed on the core member opposite the upper exterior member, wherein at least a portion of at least one upper exterior member and at least a portion of at least one lower member interpenetrate one another when subject to the force.

An aspect of an embodiment of the present invention provides a multifunctional member adapted for structural deformation and reformation. The multifunctional member comprising at least one active core member. The active core member adapted to deform if exposed to an external force and reform from a deformed state upon removal of the external force. The multifunctional member further comprising at least one upper exterior member disposed on the core member at least one lower exterior member disposed on the core member opposite the upper exterior member, wherein at least a portion of at least one upper exterior member and at least a portion of at least one lower member interpenetrate one another when subject to the force.

An aspect of an embodiment of the present invention provides a multifunctional member adapted for structural deformation and reformation. The multifunctional member comprising at least one active core member. The active core member is adapted to deform in tension if exposed to an external force and reform from a deformed state if exposed to a stimulant. The multifunctional member further comprising at least one upper expandable layer that is disposed on the core member. The upper expandable layer comprising an array of expandable units. The upper expandable units having a base dimension as defined by the dimension substantially parallel to the active core member and a height dimension as defined by the dimension substantially perpendicular to the active core member. The multifunctional member further comprising at least one lower expandable layer disposed on the active core member opposite the upper space filling layer. The lower expandable layer comprises an array of expandable units. The lower expandable units having a base dimension as defined by the dimension substantially parallel to the active core member and a height dimension as defined by the dimension substantially perpendicular to the active core member. The upper and lower expandable layers are adapted whereby when subject to the force the base dimensions of at least some of the upper and lower expandable units increase thereby deforming the active core member in tension.

An aspect of an embodiment of the present invention provides a multifunctional member adapted for structural deformation and reformation. The multifunctional member comprising at least one active core member. The active core member adapted to deform in tension if exposed to an external force and reform from a deformed state if exposed to a stimulant. The multifunctional member further comprising at least one upper three-dimensional space filling layer disposed on the core member. The upper three-dimensional space filling layer comprised of an array of out of plane truss units. The upper truss units having a base dimension as defined by the dimension substantially parallel to the active core member and a height dimension as defined by the dimension substantially perpendicular to the active core member. The multifunctional member further comprising at least one lower three-dimensional space filling layer disposed on the active core member opposite the upper space filling layer. The lower three-dimensional space filling layer comprises an array of out of plane truss units. The lower truss units having a base dimension as defined by the dimension substantially parallel to the active core member and a height dimension as defined by the dimension substantially perpendicular to the active core member. The upper and lower three-dimensional space filling layers are adapted whereby when subject to the force the base dimensions of at least some of the upper and lower truss units increase thereby deforming the active core member in tension.

An aspect of the present invention provides a multifunctional member adapted for structural deformation and reformation. The multifunctional member comprising at least one active core member. The active core member adapted to deform in tension if exposed to an external force and reform from a deformed state upon removal of the external force. The multifunctional member further comprising at least one upper expandable layer disposed on the core member. The upper expandable layer comprising an array of out of expandable units. The upper expandable units having a base dimension as defined by the dimension substantially parallel to the active core member and a height dimension as defined by the dimension substantially perpendicular to the active core member. The multifunctional member further comprising at least one lower expandable layer disposed on the active core member opposite the upper space filling layer. The lower expandable layer comprises an array of expandable units. The lower expandable units having a base dimension as defined by the dimension substantially parallel to the active core member and a height dimension as defined by the dimension substantially perpendicular to the active core member. The upper and lower expandable layers are adapted whereby when subject to the force the base dimensions of at least some of the upper and lower expandable units increase thereby deforming the active core member in tension.

An aspect of an embodiment of the present invention provides a multifunctional member adapted for structural deformation and reformation. The multifunctional member comprising at least one active core member. The active core member adapted to deform in tension if exposed to an external force and reform from a deformed state upon removal of the external force. The multifunctional member further comprising at least one upper three-dimensional space filling layer disposed on the core member. The upper three-dimensional space filling layer comprises an array of out of plane truss units. The upper truss units having a base dimension as defined by the dimension substantially parallel to the active core member and a height dimension as defined by the dimension substantially perpendicular to the active core member. The multifunctional member further comprising at least one lower three-dimensional space filling layer disposed on the active core member opposite the upper space filling layer. The lower three-dimensional space filling layer comprised of an array of out of plane truss units. The lower truss units having a base dimension as defined by the dimension substantially parallel to the active core member and a height dimension as defined by the dimension substantially perpendicular to the active core member. The upper and lower three-dimensional space filling layers are adapted whereby when subject to the force the base dimensions of at least some of the upper and lower truss units increase thereby deforming the active core member in tension.

These and other objects, along with advantages and features of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which:

FIG. 6 is a schematic illustration of an active cellular metal applied as a deployable energy absorber.

FIG. 7 is a schematic illustration of an active cellular metal applied as a self-healing active cellular metal, wherein the active cellular metal commences in a deployed state.

DETAILED DESCRIPTION OF THE INVENTION

Figure 1A:
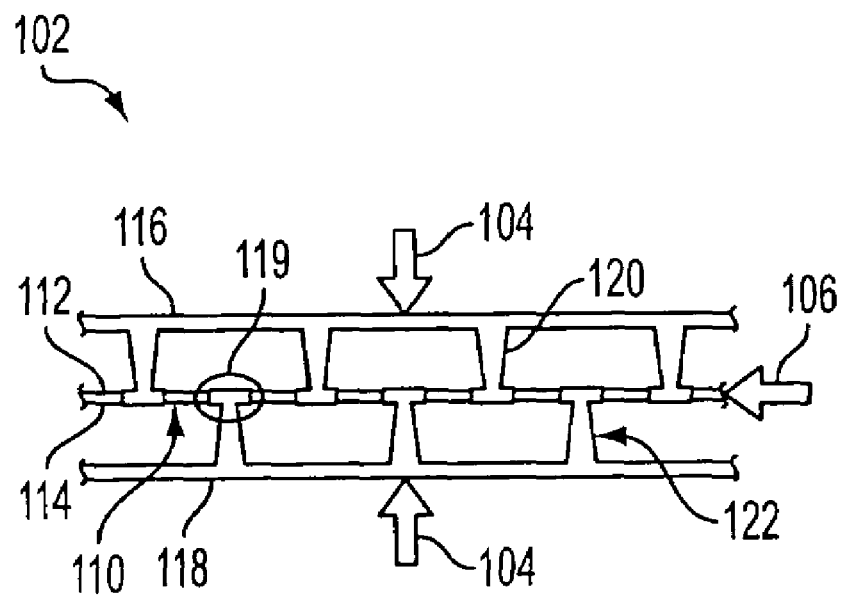
FIGS. 1(A)-(B) are schematic representations of an embodiment of the present invention self-healing/deployable active multifunctional member in both recovered/deployed configuration and collapsed configuration, respectively.

The present invention provides self-healing or deployable cellular metals or combination thereof, as well as related methods of using and manufacturing the same. The present invention provides composite structures of conventional and shape memory metals or alloys. The present invention relates generally to multifunctional cellular metals (or other materials) for structural applications that are capable of 1) recovering their original (undeformed) shape and thickness after impact or crushing (i.e., self-healing) 2) being stored or used in their compressed (i.e., crushed) state and deployed when needed to act as energy absorbing structure or packaging (i.e., deployable energy absorber) and/or 3) acting as an actuator, capable of providing localized or distributed force and displacement, and related methods of using and manufacturing the same.

Firstly, in an embodiment the present invention provides a cellular architecture/mechanism based on conventional (i.e., non-SMA) metal/alloy truss structures suspended on shape memory alloy elements (wires, strips, ribbons, sheets (continuous or perforated), or the like). In fact, any pair of interpenetrating topology structures when suspended in this way that responds to compression (crushing or impact) by interpenetration of the rigid truss structures or protrusions (struts) and consequent deformation of the SMA elements (i.e., suspension elements) in tension may be utilized.

Secondly, in an embodiment the present invention provides a cellular architecture/mechanism analogous to the scissors-jack; it includes rigid (i.e. conventional metal/alloy) truss layers alternating with SMA layers and responds to compression loading by lateral spreading of the trusses or expandable layer, and consequent deformation of the SMA elements in tension. Both embodiment types, described in greater detail below, recover their original (undeformed) configuration (size, shape, etc.) upon heating or stimulating of the SMA elements (i.e., self-healing). Alternatively, the SMA elements may be a pseudo-elastic (superelastic) shape memory alloy (SMA) which does not require heat or other stimuli to recover. Rather, the pseudo-elastic (super elastic) shape memory alloy (SMA) returns to a recovered/reformed state spontaneously and immediately on removal of the external or desired force, i.e., the applied load.

Alternatively, both of the aforementioned structures may be normally used in their compressed configuration and expanded by heating other stimuli (i.e., deployable) prior to use as an impact energy absorber. Such stimuli include, but not limited thereto electric field, magnetic field, and pressure (e.g., pyrotechnic devices). Alternatively, both of the aforementioned structures may be a pseudo-elastic (superelastic) shape memory alloy (SMA) which does not require heat or other stimuli to recover. Rather, both of the aforementioned structures may be normally used in their compressed configuration and expanded spontaneously and immediately on removal of the external or desired force, i.e., the applied load.

Figure 1B:
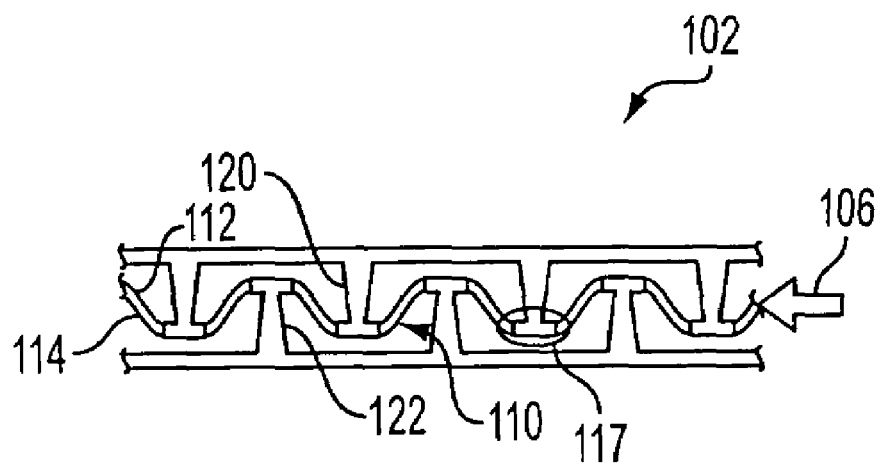

FIG. 1 schematically illustrates the concept for a two-dimensional suspended truss prototype of a multifunctional member 102. FIG. 1(A) schematically illustrates the multifunctional member 102 in a reformed or recovered state, before an external force 104 is applied to the multifunctional member 102. Whereas FIG. 1(B) schematically illustrates the multifunctional member 102 in a collapsed state, after encountering an external force 104. Through the addition of heat 106 or other stimuli, the multifunctional member 102 returns to a recovered/reformed state as seen in FIG. 1(A). Alternatively, the multifunctional member 102 is a pseudo-elastic (superelastic) shape memory alloy (SMA) which does not require heat or other stimuli to recover. Rather, the multifunctional member 102 returns to a recovered/reformed state spontaneously and immediately on removal of the external force 104, i.e., the applied load.

Still referring to FIG. 1(A), exemplary component parts of the multifunctional member 102 are seen. In the center of the member 102 is the active core member 110, having an upper surface 112, and an opposing lower surface 114. In the present exemplary embodiment, the active core member 110 is composed of a shape memory alloy (SMA) metallic substance. In proximity to the active core member 110, adjacent its upper surface 112, lays a rigid or substantially rigid upper member 116. Next, adjacent the lower surface 114 of the core member 110 lays a rigid or substantially rigid lower member 118. The rigid or substantially rigid upper member 116 in the present exemplary embodiment includes a multitude of protrusions 120 or struts or the like adjacent the active core member upper surface 112. Rigid upper member protrusions 120 or struts can either be an integral part of rigid upper member 116 or attached thereto. The rigid upper member 116 is connected to active core member 110 where the multiple protrusions 120 are adjacent the upper surface 112 of active core member 110 in the present exemplary embodiment, as shown by reference number 117. The protrusions or struts as discussed throughout this document maybe a variety of structures such as projections, fingers, posts, pillars, pedestals, legs, rods, knobs, arms, tongues, embossments, protuberances, cones, frustrums, or the like. The protrusions may be a variety of sizes and shapes or combination thereof including, but not limited thereto, the following: triangular, oval, semi-oval, rectangular, convex, cubicle, egg crate shape, spherical, semi-spherical, rectangular, pyramidal, tetrahedral, circular, cup or triangular. It is also contemplated that truss units may be utilized for the protrusions. In fact, any pair of interpenetrating topology structures when suspended in this way that responds to compression (crushing or impact) by interpenetration of the rigid truss structures or protrusions (struts) and consequent deformation of the SMA elements (i.e., suspension elements) in tension may be utilized.

In the present exemplary embodiment, the rigid lower exterior member 118 also includes a multitude of protrusions 122 or struts, which can either be an integral part of rigid or substantially rigid lower member 118 or attached thereto. The rigid lower member protrusions 122 are adjacent the lower surface 114 of the active core member 110. In the present exemplary embodiment, the rigid lower exterior member 118 is connected to active core member 110 where the rigid lower member protrusions 122 are adjacent the lower surface 114 of active core member 110, as shown by reference number 119.

The upper fastening means 117 and lower fastening means 119 can be a variety of mechanical fasteners, interlocking designs, various bonding means, attachment means, or adhesive means. For example, the rigid upper member 116 and rigid lower member 118 can be attached to the active core member 110 using, but not limited the following: fusion bond, splicing, crimping, interlocking designs or sockets, adhesives, metallurgical/chemical bonding, and mechanical fasteners (rivets, screws, threaded fasteners, bolts/nuts, etc.), or any other device. It should be noted that not all rigid upper member protrusions 120 or struts and rigid lower member protrusions 122 or struts need be fastened to active core member 110, such that a select number of attachments can be made as desired.

Turning to FIG. 1(B), the multifunctional member 102 is seen in the collapsed state, after being subjected to an external force 104 (shown in FIG. 1(A)). In the present exemplary embodiment, upper protrusions 120 are adapted to avoid lower protrusions 122 when the multifunctional member 102 is subjected to the external force 104, allowing greater energy absorption by the multifunctional member 102. In the present exemplary embodiment, the rigid upper member 116 and rigid lower member 118 do not deform, but instead transfer absorbed energy from the external force 104 to the active core member 110. The active core member 110 thus deforms in tension when the multifunctional member 102 is subjected to external force 104.

When the active core member 110 of the multifunctional member 102 as seen in collapsed form in FIG. 1(B) is subjected to heat 106 or other stimuli, it returns to its original, reformed/recovered form as seen in FIG. 1(A). In the present exemplary embodiment, when the SMA active core member 110 absorbs heat 106 or other stimulants generated by heat source or stimulant source (not shown), it reforms to its original non-tensioned shape, forcing the entire multifunctional member 102 to return to its original undeformed configuration as seen in FIG. 1(A). Alternatively, the SMA active core member 110 is a pseudo-elastic (superelastic) shape memory alloy (SMA) which does not require heat or other stimuli to recover. Rather, the active core member 110 returns to a recovered/reformed state spontaneously and immediately on removal of the external force 104, i.e., the applied load.

These approaches are based on a composite structure combining rigid members (compression members) with energy absorbing members (tensile members). The compression members (rigid upper member 116 and rigid lower member 118) are effectively suspended by the tensile active core member 110. The underlying concept on which this class of recoverable structural designs is based is therefore referred to as the suspension structure concept. As the rigid upper exterior member 116 and rigid lower exterior member 118 are pressed together, as during an impact for example, the multifunctional member 102 structure deforms by stretching the active core member 110 in tension. The active core member 110 may be shape memory alloy (SMA) wire, strip, ribbon, or sheet (continuous or perforated), or some other suitable, high-strain, recoverable material. This material could be an elastomer, or a shape memory material that responds to temperature or magnetic or electric field stimulation.

Figure 8:
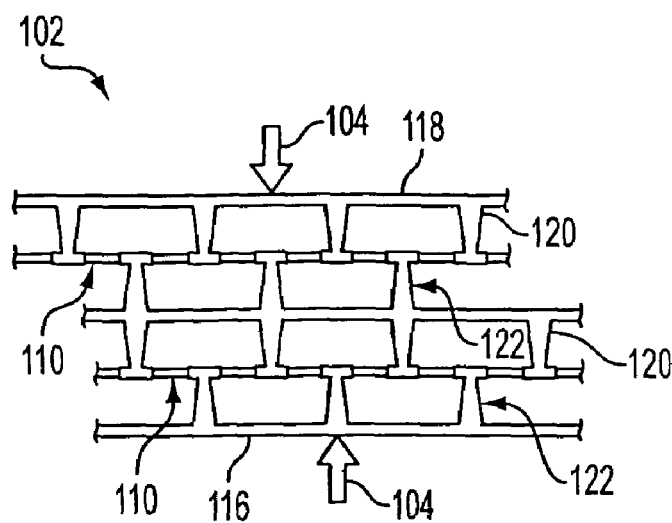
FIG. 8 is a schematic representation of an embodiment of the present invention self-healing/deployable active multifunctional member in a recovered/deployed configuration having multiple layers.

The multifunctional material 102 may be used as a single layer (i.e. one composite unit layer of conventional plus SMA components), or as a laminate of multiple (repeating) unit layers, as shown in FIG. 8, for example. FIG. 8 schematically illustrates the concept for a two-dimensional suspended truss prototype of a multifunctional member 102 having a multiple repeating layers of the upper exterior members 116, rigid lower exterior members 118, and active core members 110. Additional unit layers increases the total energy which can be absorbed on impact and the total deformation which can be recovered on self-healing of the active core member 110.

The multifunctional member 102 of FIG. 1 comprises two opposing sets of rigid exterior members 116 and 118 (e.g., metal/alloy), each having a multitude of protrusions 120 and 122 (posts, struts or egg crate cups) which are offset such that when adjacent layers of the multifunctional member 102 are pressed together, the rigid exterior member protrusions 120 and 122 interpenetrate. The rigid exterior member protrusions 120 and 122 are interconnected in the present exemplary embodiment by a shape memory alloy (SMA) wire (ribbon or sheet) active core member 110. An external compressive force 104 is applied normal or oblique to the plane of the multifunctional member 102 (as during impact or crushing) that causes the opposing sets of rigid exterior member protrusions 120 and 122 to interpenetrate and in doing so, deforms the active core member 110 in tension. The deformations of the active core member 110 material (e.g. SMA) acts to absorb energy during impact/crushing.

Alternatively, as well be discussed in greater detail infra the multifunctional member 102 can be uniformly and intentionally compacted (crushed) into its collapsed state as seen in FIG. 1(B), and deployed by introducing heat 106 or other stimuli (or alternatively, upon the removal of a desired, expected, predetermined, resultant, controlled force or forces) to the SMA active core member 110 just prior to an impact of an external force 104.

The SMA material discussed throughout this document may be made of from a material or composite of materials including, but not limited thereto, the following: Ni—Ti, Ni—Ti—V, Ni—Ti—Fe, Ni—Ti—Cu, Ni—Ti—C—, Ni—Ti—Cr, Ni—Ti—Nb, Ni—Ti—Pd, Ni—Ti—Fe, Cu—Zn—Al, Cu—Al—Ni and Fe—Mn—Si. The SMA material may also include magnetic SMA and polymer SMA.

The upper member 116 and lower member 118 may be comprised of but not limited to polymers, metals, or ceramics, or any combination thereof.

Figure 2A:
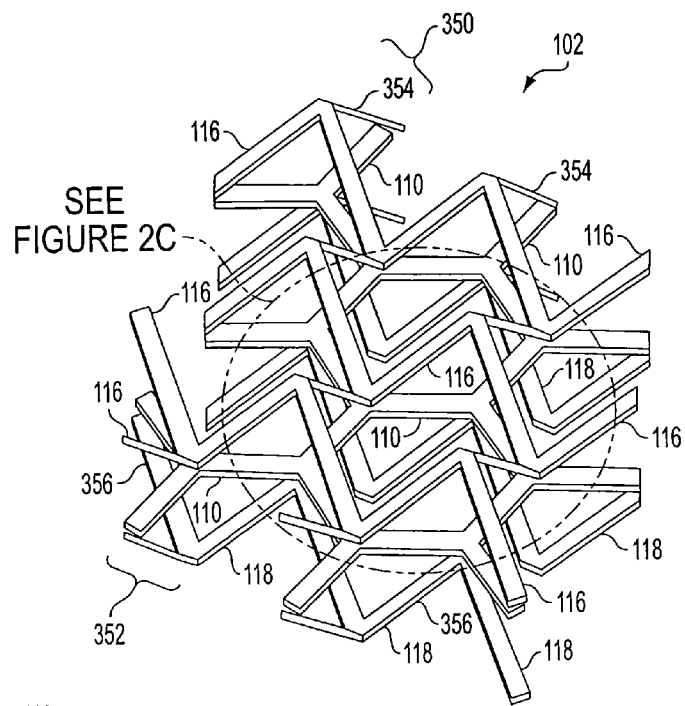
FIGS. 2(A)-(B) are schematic representations of an embodiment of the present invention self-healing/deployable active multifunctional member in the reformed/deployed configuration and collapsed configuration, respectively, wherein the core is three dimensional.
Figure 2B:
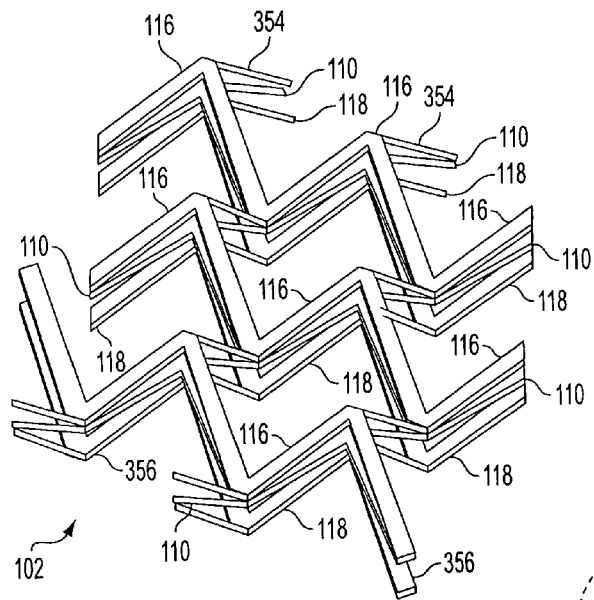
Figure 2C:
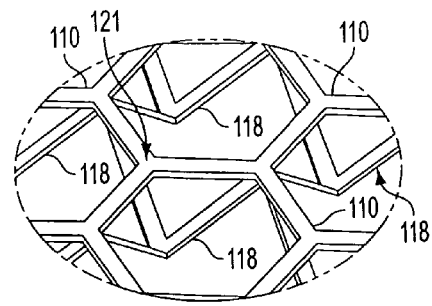
FIG. 2(C) schematically illustrates an enlarged partial view of a portion of the multifunctional member as shown in FIG. 2(A) wherein the active core member is aligned above the lower exterior member (the upper exterior member is not shown).

While FIG. 1 illustrates an exemplary two-dimensional embodiment, the suspension concept is readily extendable to 3-D architectures, as shown by the exemplary embodiment shown in FIGS. 2(A)-(C). The present exemplary embodiment uses an upper and a lower layer of truss-core lattice layer 350, 352 comprised of out of plane truss units 354, 356 (consisting of tetrahedral or pyramidal elements, for example, as well as kagome, cone, frustrum, and combinations thereof and other non-limiting arrangements) as the rigid or substantially rigid upper member 116 and rigid lower exterior member 118, respectively, alternating with perforated hexagonal cell SMA sheet active core member 110. The rigid upper exterior member 116 and rigid lower exterior member 118 are stacked directly over one another so that they will interpenetrate when a crushing force (not shown) is applied normal to the plane of the multifunctional member 102 as seen in FIG. 2(B). As the rigid upper exterior member 116 and the rigid lower exterior member 118 layers interpenetrate, the ligaments of the SMA hex cell active core member 110 are deformed in tension. In the present exemplary embodiment, upon the addition of heat 106 or other stimuli to active core member 110, either by direct resistance, or by some other indirect method, to above the austenite finish $A_f$ temperature, the SMA active core member 110 will revert to its original undeformed configuration as seen in FIG. 2(A). This cycle of deformation by exposing the multifunctional member 102 to an external force 104 (not shown), followed by shape memory recovery of the active core member 110 that can be repeated indefinitely.

Alternatively, the active core member 110 is a pseudo-elastic (superelastic) shape memory alloy (SMA) which does not require heat or other stimuli to recover. Rather, the active core member 110 returns to a recovered/reformed state spontaneously and immediately on removal of the external force 104 (not shown), i.e., the applied load.

As for the SMA material discussed throughout this document, the SMA's could be those that are stimulated by temperature or magnetic or other stimuli. As an example, consider the metal SMA systems. These should be heated to ensure that they are in the austenite condition, and the heating will be to a temperature to above the so called austenite finish $A_f$. That's the characteristic temperature to insure that the entire shape memory alloy has reverted to the austenite phase, i.e. the high temperature phase, i.e., the transition temperature. Typically, this is approximately in the range of about 0 to about 170° C., but may be as broad as about −20 to about 770° C. Other transformation temperature ranges may be affected by selecting the alloy composition as required by the intended application, e.g., an optimal temperature range can be chosen by selecting the appropriate actuator material.

Moreover, the various embodiments described herein, the active cores are provided with a means of heating to a temperature sufficient to achieve the temperature range at the level or rate of change deemed adequate for the intended application. Heating or stimulation may be achieved by direct resistance (Joule) heating of the SMA face sheet (i.e. by the attachment of suitable electrical contacts and the passage of current through the face sheet), by resistance heating of a conductor attached to, or located within the active core, by the use of a heated fluid or gas, by radiative means (e.g. Xenon lamp, laser, etc.), or other alternative approaches as appreciated by those skilled in the art. Other stimulation may eventually include electric, magnetic, electromagnetic, or perhaps sound fields.

Alternatively, as will be discussed in greater detail infra the multifunctional member 102 can be uniformly and intentionally compacted (crushed) into its collapsed state as seen in FIG. 2B, and deployed by introducing heat (not shown) or other stimuli (or alternatively, upon the removal of a desired, expected, predetermined, resultant, or controlled force or forces) to the SMA active core member 110 just prior to an impact of an external force 104.

Referring to FIG. 2(A), layers of tetrahedral truss core material formed of metal/alloy or polymer rigid members 116 and 118 alternate with a layer of perforated SMA sheet active core member 110 there between. The tetrahedral layers are positioned such that the rigid (or substantially rigid) upper member 116 and rigid (or substantially rigid) lower exterior members 118 nest (interpenetrate) when exposed to an external force (not shown) during compression or crushing as seen in FIG. 2(B). As for the 2-D case, the SMA active core member 110 is deformed in tension as the rigid upper member 116 and rigid lower member 118 layers are pressed together (i.e., towards one another) by the external force. To recover the reformed/undeformed configuration of the multifunctional member 102, the SMA active core member 110 in the present exemplary embodiment is heated (or stimulated) to above the austenite finish $A_f$ temperature or stimulated state as required.

Alternatively, the active core member 110 is a pseudo-elastic (superelastic) shape memory alloy (SMA) which does not require heat or other stimuli to recover. Rather, the active core member 110 returns to a recovered/reformed state spontaneously and immediately on removal of the external force 104 (not shown), i.e., the applied load.

Turning to FIG. 2(C), FIG. 2(C) schematically illustrates an enlarged partial view of a portion of the multifunctional member 102 with the lower member 118 aligned with perforated hexagonal cell SMA sheet active core member 110. Reference number 121 reveals the location where the node or leg of the upper exterior member 116 (not shown in this view) would contact the upper surface of the active core member 112.

Figure 3A:
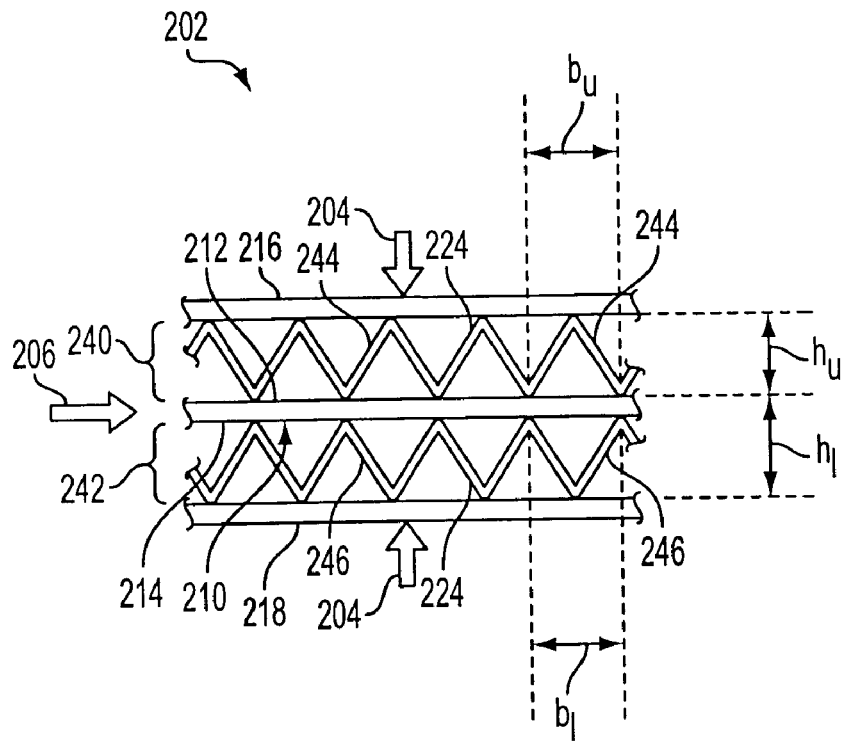
FIGS. 3(A)-(B) are schematic representations of an embodiment of the present invention of a scissors type self-healing/deployable active cellular multifunctional member in both reformed/deployed configuration and collapsed configuration, respectively.
Figure 3B:
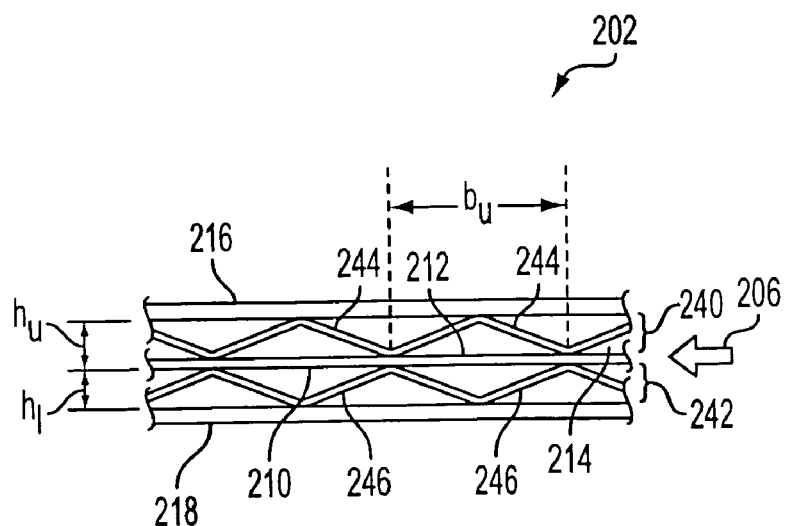

An embodiment of the present invention multifunction member is a scissors jack-like concept as illustrated in FIGS. 3(A)-(B). The scissors jack design concept again relies on truss structures constructed using metal/alloy or polymers and which are subjected primarily to compression and SMA elements deforming in tension and which exhibits deployable/self-healing active behavior. Generally speaking, in its classic configuration, this device comprises four rigid struts connected by pivot points or pins at their ends to form a trapezoid (or better, a diamond shape). If two opposite pivot points or pins are pulled towards one another, the remaining adjacent or proximate two pivot points or pins are forced outwards, away from one another. For example, the automobile scissors jack relies on a threaded bolt or screw to pull the pivot points or pins together, thereby lifting a car as the other two pins are forced apart. Conversely, as the car presses down on the jack, it applies a tensile force to the screw.

The present invention cellular metal energy absorbing multifunctional member concept replaces the screw actuator with a shape memory alloy element (wire, strip, ribbon, band, sheet (continuous or perforated), or the like) active core member 210 and upper expandable layer 240 and lower expandable layer 242 (e.g., rigid links) comprised of rigid or substantially rigid upper expandable units 244 and lower expandable units 246.

FIG. 3(A) shows an example of a 2-D prototype of the scissors-type structure; the present exemplary embodiment comprises two layers of corrugated metal sheet (e.g., 304 stainless steel), to form the upper expandable layer 240 and a lower expandable layer 242 arranged in mirror symmetry or substantially mirror symmetry about a central SMA active core member 210 sheet. The reformed/undeformed repeating scissors jack element is readily visible when viewed on end, as in FIG. 3(A). As the multifunctional member 202 is compressed when exposed to an external force 204 during impact, the corrugated rigid upper and lower expandable layers 240 and 242 (which experience compressive loading) transmit tensile load to the SMA active core member 210, deforming it in tension in lateral directions or near lateral directions. The resulting structure can be viewed in FIG. 3(B). The multifunctional member 202 absorbs energy as it crushes and may be recovered/reformed (redeployed) by applying heat 206 or other stimuli from a heat source (not shown) to the SMA active core member 210 in quantity to bring it to its austenite finish $A_f$ temperature or stimulated state. Alternatively, the multifunctional member 202 is a pseudo-elastic (superelastic) shape memory alloy (SMA) which does not require heat or other stimuli to recover. Rather, the multifunctional member 202 returns to a recovered/reformed state spontaneously and immediately on removal of the external force 204, i.e., the applied load.

In the present exemplary embodiment, upper expandable units 224 each have two dimensions. The first of upper expandable units 244 dimension is $b_u$, the linear (or substantially linear) distance measured from one point of contact of the upper expandable unit 244 with the upper surface 212 of active core member 210 to the next immediate such point of contact. The dimension $b_u$ is at least substantially parallel to the upper surface 212 of active core member 210. The second of upper expandable units 246 dimension is $h_u$, the linear distance measured at least substantially perpendicularly from the upper surface 212 of active core member 210 to a point on the upper expandable unit 244 furthest from the upper surface 212 of the active core member 210.

Similarly, in the present exemplary embodiment, lower expandable unit 246 has two dimensions. The first of lower expandable unit dimensions is $b_l$, the linear distance measured from one point of contact of the lower expandable unit 246 with the lower surface 214 of active core member 210 to the next immediate such point of contact. The dimension $b_l$ is parallel to the lower surface 214 of active core member 210. The second of lower expandable unit 246 dimension is $h_l$, the linear distance measured at least substantially perpendicularly from the lower surface 214 of active core member 210 to a point on the lower expandable unit 246 furthest from the lower surface 214 of the active core member 210.

In the present exemplary embodiment, when the multifunctional member 202 seen in FIG. 3(A) is exposed to an external force 204, the dimensions $b_u$ and $b_l$ increase, while the dimensions $h_u$ and $h_l$ decrease. Conversely, when the SMA active core member 210 of the multifunctional member 202 seen in FIG. 3(B) is exposed to heat 206 and reforms to its original undeformed/reformed configuration, the dimensions $b_u$ and $b_l$ decrease, while the dimensions $h_u$ and $h_l$ increase. Alternatively, the multifunctional member 202 is a pseudo-elastic (superelastic) shape memory alloy (SMA) which does not require heat or other stimuli to recover. Rather, the multifunctional member 202 returns to a recovered/reformed state spontaneously and immediately on removal of the external force 204, i.e., the applied load, and reforms to its original undeformed/reformed configuration, the dimensions $b_u$ and $b_l$ decrease, while the dimensions $h_u$ and $h_l$ increase.

Figure 9:
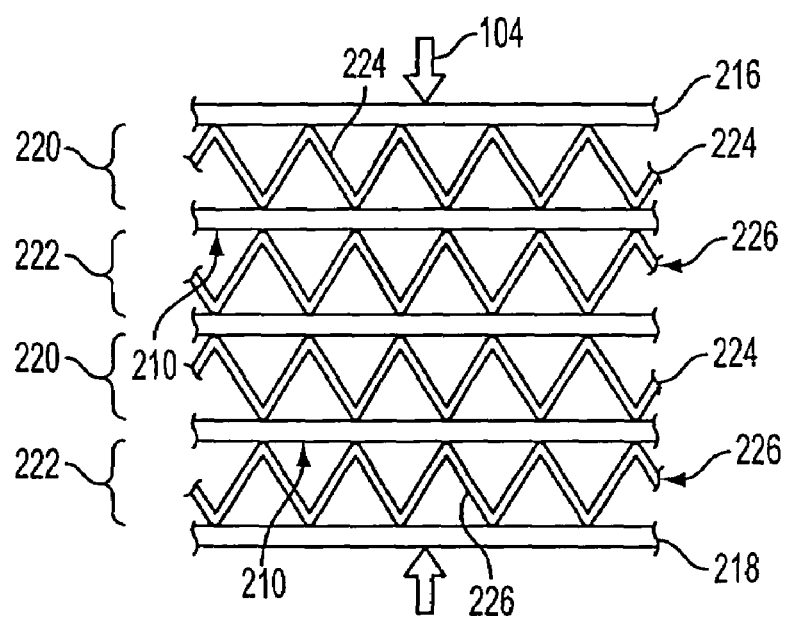
FIG. 9 is a schematic representation of an embodiment of the present invention scissor type self-healing/deployable active multifunctional member in a recovered/deployed configuration having multiple layers.

The multifunctional structure 202 may be used as a single layer (i.e. one composite unit layer of conventional plus SMA components), or as a laminate of multiple (repeating) unit layers, as shown in FIG. 9, for example. FIG. 9 schematically illustrates the concept for a two-dimensional scissor truss prototype of a multifunctional member 202 having a multiple repeating layers of the upper exterior members 216, rigid lower exterior members 218, upper expandable layer 240, lower expandable layer 242 and active core members 210. Additional unit layers increases the total energy which can be absorbed on impact and the total deformation which can be recovered on self-healing of the active core member 210.

Figure 4B:
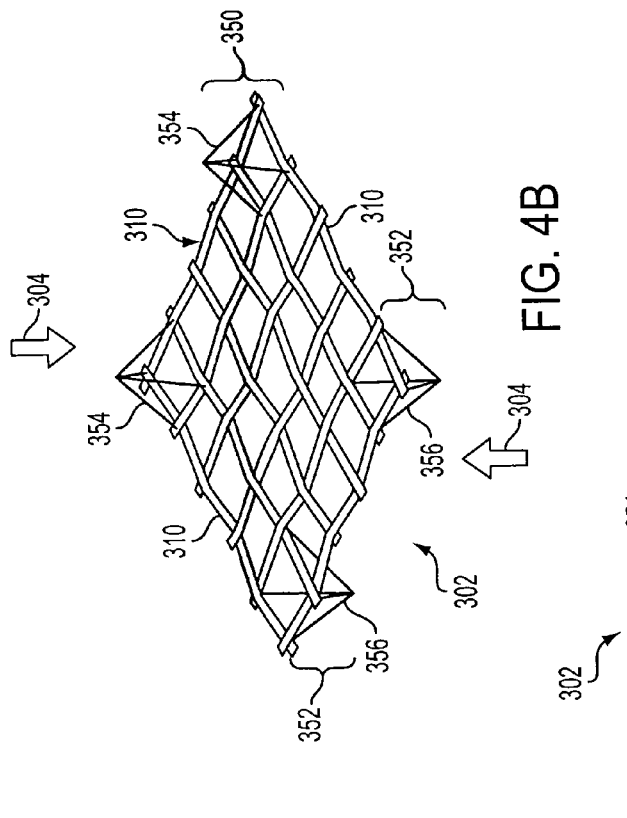
FIG. 4(B) schematically illustrates a square cell SMA active core member that corresponds to pyramidal rigid upper and lower truss members.
Figure 4A:
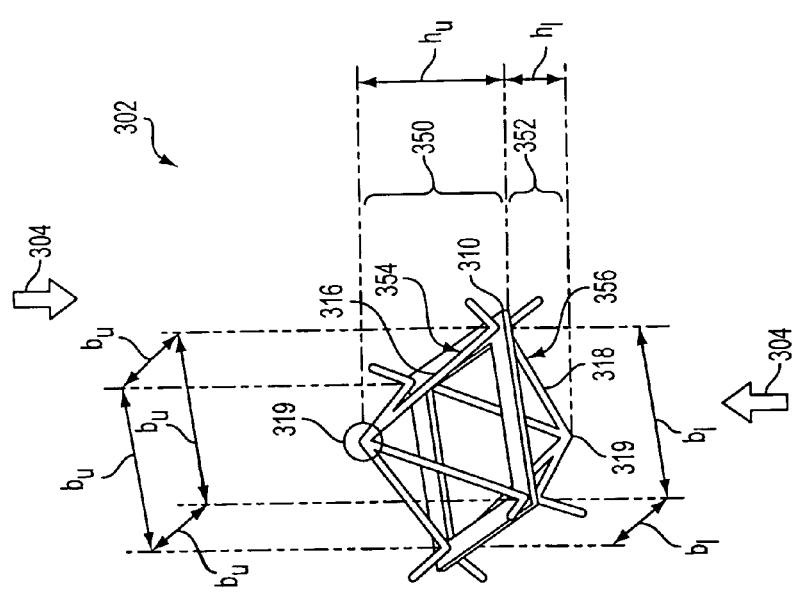
FIG. 4(A) schematically illustrates a partial view of an embodiment of the present invention scissor type self-healing/deployable active multifunctional member in the reformed/deployed configuration wherein the core is three-dimensional.

Turning to FIGS. 4(A)-(B), FIGS. 4(A)-(B) schematically illustrate partial view of an embodiment of the present invention scissor type self-healing/deployable active multifunctional member 302 in the reformed/deployed configuration wherein the core is three dimensional. As illustrated, for the suspended structure concept, the scissors structure may be extended to 3-D architectures. This example comprises upper three-dimensional space filling layer 350 comprising pyramidal rigid upper truss units 354 and lower three-dimensional space filling layer 352 comprising lower truss units 356 that sandwich perforated square cell SMA active core member 310 sheets. While FIGS. 4(A)-(B) only show a limited number of pyramidal rigid upper truss units 324 and lower truss units 356 for the sake of simplifying the drawings, it should be understood that a predetermined number of truss units 354, 356 may be utilized with the multifunction member 302.

Looking particularly at FIGS. 4(A)-(B), in contrast with the suspended structure of FIG. 2, the pyramid units in the present exemplary embodiment are now positioned in mirror symmetry about the SMA sheet 310. Thus, rather than interpenetrating during crushing when the multifunctional member 302 is exposed to an external force (not shown), the pyramids are forced to spread laterally or substantially lateral (i.e. in the plane of the sheet the dimensions $b_u$ and $b_l$ increasing), stretching the SMA ligaments of the active core member 310 as they do so. The desired upper three-dimensional space filling layer 350 comprised of upper out of plane truss units 354 and the lower three-dimensional space filing layer 352 comprised of lower out of plane truss units 356 are spread laterally.

In some embodiments, the scissors-type structures comprise pin, rotation, pivot joints/attachments 319 or suitable means to accommodate relative rotation of compressive struts during crushing.

In operation, when the multifunctional member 302 seen in FIGS. 4(A)-(B) is exposed to an external force 304, the dimensions $b_u$ and $b_l$ increase, while the dimensions $h_u$ and $h_l$ decrease. Next, when the SMA active core member 310 of the multifunctional member 302 is exposed to heat (not shown) and reforms to its original undeformed/reformed configuration, the dimensions $b_u$ and $b_l$ decrease, while the dimensions $h_u$ and $h_l$ increase. Alternatively, the multifunctional member 302 is a pseudo-elastic (superelastic) shape memory alloy (SMA) which does not require heat or other stimuli to recover. Rather, the multifunctional member 302 returns to a recovered/reformed state spontaneously and immediately on removal of the external force, i.e., the applied load, and reforms to its original undeformed/reformed configuration, the dimensions $b_u$ and $b_l$ decrease, while the dimensions $h_u$ and $h_l$ increase.

Figure 5:
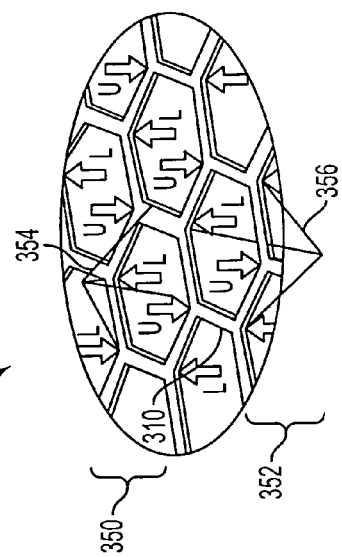
FIG. 5 schematically illustrates a partial view of an embodiment of the present invention scissor type self-healing/deployable active multifunctional member in the reformed/deployed configuration wherein the core is a cellular hex sheet corresponding to tetrahedral rigid upper and lower truss members.

Similarly, turning to FIG. 5, FIG. 5 schematically illustrates a partial view of an embodiment of the present invention scissor type self-healing/deployable active multifunctional member 302 in the reformed/deployed configuration wherein the active core 310 is hexagonal cellular. As illustrated, for the suspended structure concept, the scissors structure may be extended to 3-D architectures. This example comprises an upper three-dimensional space filling layer 350 comprised of tetrahedral truss units 354 and lower three-dimensional space filling layer 352 comprised of tetrahedral truss units 356 that sandwich perforated hex cell SMA active core member sheets 310. While FIG. 5 only show a limited number of upper tetrahedral truss units 354 and lower tetrahedral truss units 356 for the sake of simplifying the drawings, it should be understood that a predetermined number of truss units may be utilized with the multifunction member 302.

Looking particularly at FIG. 5, in contrast with the suspended structure of FIG. 2, the tetrahedra in the present exemplary embodiment are now positioned in mirror symmetry about the SMA sheet 310. Thus, rather than interpenetrating during crushing when the multifunctional member 302 is exposed to an external force (not shown), the tetrahedra are forced to spread laterally or substantially lateral (i.e. in the plane of the sheet the dimensions $b_u$ and $b_l$ are increasing), stretching the SMA ligaments or legs of the active core member 310 as they do so.

The active cellular metal based on the scissors-type design provides a strong tendency to expand laterally or near laterally during crushing. If crushing is localized, as during indentation, material surrounding the indentation must somehow accommodate the lateral deformation. In some applications, it shall be important to avoid local buckling of compressive struts, which will occur if no accommodation mechanism is available. Further, scissors-type structures incur relative rotation of compressive struts during crushing. In the absence of any mechanism for rotation of the struts (e.g. pin joint or pivot joints, journals), the rotation must occur by localized deformations in the region where two or more struts connect with each other. Clearly, unless these deformations are kept acceptably small, struts will fail at or near the joint due to static overload or fatigue.

Turning to FIGS. 6(A)-(C), FIG. 6(A) schematically illustrate how any of the herein mentioned active cores of the multifunctional members can be applied as a deployable energy absorber. The multifunctional member 495 has a active core member 480 that is shown first in its normal (compressed) configuration with the upper exterior member 470 and lower exterior member 490 (FIG. 6(A). Next; heating of the SMA elements to the $A_f$ temperature or stimulating the SMA elements causes the cellular structure to deploy as shown in FIG. 6(B). Alternatively, the multifunctional member 495 is a pseudo-elastic (superelastic) shape memory alloy (SMA) which does not require heat or other stimuli to recover. Rather, the multifunctional member 495 returns to a recovered/reformed state spontaneously and immediately on removal of a desired force, i.e., the applied load. The material is then able to absorb energy during an impact by (tensile) deformation of the SMA substructure as shown in FIG. 6(C). Finally, the material can be compressed to its normal configuration, ready to be re-deployed on demand as shown in FIG. 6(D).

In contrast, FIG. 7(A) schematically illustrates the multifunctional member already in its deployed sate, i.e., the original (undeformed) configuration. As such, as shown in FIG. 7(B), the multifunctional member 495 is subjected to deformation as a result of impact. Finally, the material is able to recover (self heal) its original configuration by activating the shape memory element as shown in FIG. 7(C). Alternatively, the multifunctional member 495 is a pseudo-elastic (superelastic) shape memory alloy (SMA) which does not require heat or other stimuli for activation to recover. Rather, the multifunctional member 495 returns to a recovered/reformed state spontaneously and immediately on removal of a desired force, i.e., the applied load.

Regarding the manufacturing and process development, the active cellular metals described herein may be based on composite laminates of conventional metal/alloy and shape memory alloy precursors, joined (metallurgically or by some other means) to create the final material. The conventional metal/alloy precursors may be manufactured from sheet stock formed either by deformation processing alone (e.g. corrugated sheet structure) or produced by a combination of cutting/punching and forming operations (i.e. the tetrahedral truss-core material). The SMA precursor (or other active material) is either wire, strip or sheet (either as-received or perforated to create a hexagonal cell array).

Conventional metal/alloy and SMA components may be joined metallurgically at moderate temperature by soldering (e.g. using a specially developed flux in combination with Ag—Sn solder [7]). Intermediate and high temperature joining processes may include brazing and liquid phase sintering. More costly alternatives such as laser and electron beam welding have also demonstrated successful joining with only a moderate effect on shape memory performance reported [8]. Thus, in summary, available bonding techniques include, but not limited to the following: brazing bonded, UV welding bonded, laser welding bonded, electron beam welded, resistance welded, ultrasonically/friction welded, fusion welded or diffusion welding bonded.

Design and manufacture is also affected by the method chosen for heating the SMA during deployment/healing. Direct resistance (Joule) heating may be considered, but since the SMA components will not, in general, be isolated from contact with the metallic compression components, this may be inefficient and, perhaps more importantly, slow. Alternative means would include use of insulated resistance heating elements (e.g. polyamide coated NiCr wire) either bonded to or wrapped around SMA elements, or the flow of a heated fluid through the cellular structure.

According to the design criteria discussed throughout, SMA attributes and structures may be implemented with the present invention as described in the co-pending and commonly assigned PCT Application No.: US 02/27116 filed Aug. 26, 2002, entitled "Reversible Shape Memory Multifunctional Structural Designs and Method of Using the Same," (Publication No.: WO 03/018853 A2) and corresponding U.S. application Ser. No. 10/487,291, filed Feb. 20, 2004, of which are incorporated by reference herein in their entirety.

According to the design criteria discussed throughout, other two-dimensional and three-dimensional structures may be implemented with the present invention as shown in co-pending and co-assigned PCT International Application No. PCT/US02/17942, entitled "Multifunctional Periodic Cellular Solids And The Method Of Making Thereof," filed on Jun. 6, 2002, and corresponding U.S. patent application Ser. No. 10/479,833, filed Dec. 5, 2004, of which are hereby incorporated by reference herein in their entirety.

According to the design criteria discussed throughout, other two-dimensional and three-dimensional structures may be implemented with the present invention as provided in co-pending and co-assigned PCT International Application No. PCT/US01/17363, entitled "Multifunctional Periodic Cellular Solids and the Method of Making thereof," filed on May 29, 2001, and corresponding U.S. application Ser. No. 10/296,728, filed Nov. 25, 2002, of which are hereby incorporated by reference herein in their entirety.

According to the design criteria discussed throughout, other two-dimensional and three-dimensional structures may be implemented with the present invention as shown in co-pending and co-assigned PCT International Application No. PCT/US03/16844, entitled "Method for Manufacture of Periodic Cellular Structure and Resulting Periodic Cellular Structure," filed on May 29, 2003, and corresponding U.S. application Ser. No. 10/515,572, filed Nov. 23, 2004, of which are hereby incorporated by reference herein in their entirety.

The publications as cited throughout this document and provided below are hereby incorporated by reference herein in their entirety.

[1] Gibson, L. and Ashby, M. F., Cellular Solids—Structure and Properties, Pergamon Press (1988).

[2] Miyoshi, T., Itoh, M., Akiyama, S. and Kitahara, A., "Aluminum Foam ALPORAS: Production process, properties and applications", MRS V. 521, 133 (1998).

[3] Banhart, J. and Baumeister, J., "Production methods for Metallic Foams", MRS V. 521, 133 (1998).

[4] Sypeck, D. S. and Wadley, H. N. G., "Cellular Metal Truss core Sandwich Structures", MetFoam 2001 Conf. Proc. (2001).

[5] Mumm, D. R., Chiras, S., Evans, A. G., Hutchinson, J. W., Sypeck, D. J. and Wadley, H. N. G., "On the Performance of Lightweight Metallic Panels Fabricated Using Textile Technology", submitted (2001).

[6] Elzey, D. M., Sofia, A. and Wadley, H. N. G., "Shape memory-based multifunctional actuator panels", In: Industrial and Commercial Applications of Smart Structures and Technologies, Proceedings of SPIE Vol. 4698 (2002).

[7] Pelton, A., Nitinol Devices and Components, NDC NT Flux, Fremont, Calif.

[8] Tuissi, A., Besseghini, S., Squatrito, F., Pozzi, M., "Effect of Nd-YAG laser welding on the functional properties of Ni-49.6 at. % Ti", Mat. Sci. & Eng. A 273-275, pp. 813-817 (1999).

In conclusion, some advantages of the present invention multifunctional cellular structures is that it they are capable of 1) recovering their original (undeformed) shape and thickness after impact or crushing (i.e., self-healing), 2) being stored or used in their compressed (i.e., crushed) state and deployed when needed to act as energy absorbing structure or packaging (i.e., deployable energy absorber), and/or 3) acting as an actuator, capable of providing localized or distributed force and displacement.

Other advantages of the present invention multifunctional cellular structures, and related methods of using and manufacturing the same, are that they provide: lightweight structural material which is deployable on demand to absorb impact energy; capability to store structures compactly when not in use (undeployed) to absorb energy; light, stiff, and strong structural characteristics; corrosion resistant material if desired; low cost manufacturing capability; and high specific energy absorption with design-tunable crushing stress.

Further advantages of the present invention multifunctional cellular structures (especially panels), and related methods of using and manufacturing the same, are that they provide: lightweight structural integrity; moderately strong, stiff load-bearing materials; and capability of being joined by conventional joining and attachment means (brazing, welding, mechanical fasteners, etc).

Still yet, advantages of the present invention multifunctional cellular structures (especially panels), and related methods of using and manufacturing the same, are that they may be applied to a variety of applications including, but not limited thereto: crash/impact energy absorption (deployable) systems for automobile interiors, packaging, crates, containers, weapons containers tossed/parachuted from aircraft/helicopters, architectural applications, interior/exterior panels/padding, aircraft interiors, and military vehicle interiors.

Finally, advantages of the present invention multifunctional cellular structures (especially panels), and related methods of using and manufacturing the same, are that they may be applied to a variety of applications including, but not limited thereto self-healing cellular metals, automatic body panels, boats/ships hull cladding, and train cars interior/exterior.

The invention may be embodied in other specific forms without departing from the spirit or essential characteristics thereof. Of course, it should be understood that a wide range of changes and modifications can be made to the preferred embodiment described above. The foregoing embodiments are therefore to be considered in all respects illustrative rather than limiting of the invention described herein. Scope of the invention is thus indicated by the appended claims as read in light of the foregoing description, including all equivalents, and all changes which come within the meaning and range of equivalency of the claims are therefore intended to be embraced herein.

We claim:

1. A multifunctional member adapted for structural deformation and reformation, the multifunctional member comprising:
at least one active core member, said active core member adapted to deform if exposed to an external force, and reform from a deformed state if exposed to a stimulant;
at least one upper member disposed on said core member, said upper member including a plurality of upper protrusions, said protrusions generally protruding in the direction of said active core member; and
at least one lower member disposed on said core member opposite said upper member, said lower member including a plurality of lower protrusions, said protrusions generally protruding in the direction of said active core member;
said upper protrusions and lower protrusions being aligned relative to one another such that they will interpenetrate when subjected to the force, thereby deforming said active core member, and will return to non-interpenetrating positions upon removal of the force when said active core member is exposed to said stimulant.

2. The multifunctional member of claim 1, wherein said stimulant is heat.

3. The multifunctional member of claim 1, wherein stimulant provides at least one transition temperature range to said active core member.

4. The multifunctional member of claim 3, wherein said transition temperature range is between about −20° C. to about 770° C.

5. The multifunctional member of claim 3, wherein said transition temperature range is between about 20° C. to about 120° C.

6. The multifunctional member of claim 3, wherein said transition temperature ranges are about 50° C. to about 70° C.

7. The multifunctional member of claim 1, wherein said stimulant is at least one of electric field, electromagnetic field, and magnetic field, or any combination thereof.

8. The multifunctional member of claim 7, wherein said active core member is repeatedly exposed to deformation and said stimulant, said active core member is adapted to perform fully reversible cyclic shape changes between deformed and reformed states.

9. The multifunctional member of claim 1, wherein said active core member is operable to alter the shape of the multifunctional member.

10. The multifunctional member of claim 1, wherein said active core is made from a material selected from the group consisting of Ni—Ti, Ni—Ti—V, Ni—Ti—Fe, Ni—Ti—Cu, Ni—Ti—C—, Ni—Ti—Cr, Ni—Ti—Nb, Ni—Ti—Pd, Ni—Ti—Fe, Cu—Zn—Al, Cu—Al—Ni and Fe—Mn—Si.

11. The multifunctional member of claim 1, wherein said core is made from composites formed of one or more of a material selected from the group consisting of Ni—Ti, N i—Ti—V, Ni—Ti—Fe, Ni—Ti—Cu, Ni—Ti—C—, Ni—Ti—Cr, Ni—Ti—Nb, Ni—Ti—Pd, Ni—Ti—Fe, Cu—Zn—Al, Cu—Al—Ni and Fe—Mn—Si.

12. The multifunctional member of claim 1, wherein said active core is made from at least one of an elastomer material, a magnetic SMA material, and a polymer SMA material or any combination thereof.

13. The multifunctional member of claim 1, wherein at least some of said protrusions of said upper member and said lower member are comprised of at least one shape or combination of the shapes including oval, semi-oval, triangular, rectangular, convex, cubicle, egg crate cup shape, spherical, semi-spherical, rectangular, pyramidal, tetrahedral, circular, frustrum, conical, or triangular.

14. The multifunctional member of claim 1, wherein said active core is bonded to at least some of said protrusions, wherein said bond is at least one of brazing bonded, UV welding bonded, laser welding bonded, electron beam welded, resistance welded, ultrasonically/friction welded, fusion welded or diffusion welding bonded.

15. The multifunctional member of claim 1, wherein said active core is attached to at least some of said protrusions, wherein said attachment is at least one of splicing, crimping, interlocking designs or sockets, adhesives, metallurgical/chemical and mechanical fasteners.

16. The multifunctional member of claim 15, wherein said mechanical fasteners include at least one of rivets, screws, threaded fasteners, and bolts and nuts.

17. The multifunctional member of claim 1, wherein said upper member and said lower member are made from a material selected from the group consisting of polymers, metals, and ceramics.

18. The multifunctional member of claim 1, wherein said upper member and lower member are made from composites formed of one or more of a material selected from the group consisting of polymers, metals, and ceramics.

19. A multifunctional member adapted for structural deformation and reformation, the multifunctional member comprising:
at least one active core member, said active cellular core member adapted to deform if exposed to an external force, and reform from a deformed state if exposed to a stimulant;
at least one upper three-dimensional space filling layer disposed on said core member, said upper three-dimensional space filling layer comprised of an array of out of plane truss units;
at least one lower three-dimensional space filling layer disposed on said active core member opposite said upper space filling layer, said lower three-dimensional space filling layer comprised of an array of out of plane truss units; said at least some of said upper and lower three-dimensional space filling layers are aligned relative to one another such that they will interpenetrate when subjected to the force.

20. The multifunctional member of claim 19, wherein said out-of-plane truss units have a geometrical shape selected from the group consisting of: tetrahedral, pyramidal, Kagome, cone, frustrum combinations thereof and other non-limiting arrangements.

21. The multifunctional member of claim 19, wherein said out-of-plane truss units have hollow or solid leg members.

22. The multifunctional member of claim 19, wherein said out-of-plane truss form a perforated or solid sheet.

23. A multifunctional member adapted for structural deformation and reformation, the multifunctional member comprising:
at least one active core member, said active core member adapted to deform in tension if exposed to an external force, and reform from a deformed state if exposed to a stimulant;
at least one upper expandable layer disposed on said core member, said upper expandable layer comprising an array of expandable units, said upper expandable units having a base dimension as defined by the dimension substantially parallel to said active core member, and a height dimension as defined by the dimension substantially perpendicular to said active core member;
at least one lower expandable layer disposed on said active core member opposite said upper space filling layer, said lower expandable layer comprised of an array of expandable units, said lower expandable units having a base dimension as defined by the dimension substantially parallel to said active core member, and a height dimension as defined by the dimension substantially perpendicular to said active core member, and said upper and lower expandable layers are adapted whereby when subject to the force the height dimensions of at least some of the upper and lower expandable units decrease thereby deforming the active core member in tension.

24. The multifunctional member of claim 23, wherein said upper and lower expandable layers is a corrugated strip, corrugated band, corrugated ribbon, or corrugated sheet.

25. The multifunctional member of claim 23, wherein said deformed active core member is deformed in a substantially lateral direction or lateral direction.

26. A multifunctional member adapted for structural deformation and reformation, the multifunctional member comprising:
at least one active core member, said active core member adapted to deform in tension if exposed to an external force, and reform from a deformed state if exposed to a stimulant;
at least one upper three-dimensional space filling layer disposed on said core member, said upper three-dimensional space filling layer comprised of an array of out of plane truss units, said upper truss units having a base dimension as defined by the dimension substantially parallel to said active core member, and a height dimension as defined by the dimension substantially perpendicular to said active core member;
at least one lower three-dimensional space filling layer disposed on said active core member opposite said upper space filling layer, said lower three-dimensional space filling layer comprised of an array of out of plane truss units, said lower truss units having a base dimension as defined by the dimension substantially parallel to said active core member, and a height dimension as defined by the dimension substantially perpendicular to said active core member, and said upper and lower three-dimensional space filling layers are adapted whereby when subject to the force the height dimensions of at least some of the upper and lower truss units decrease thereby deforming the active core member in tension.

27. The multifunctional member of claim 26, wherein at least some of said upper and lower out of plane truss units are tetrahedral.

28. The multifunctional member of claim 27, wherein at least one of said active core members is a hexagonal cellular sheet.

29. The multifunctional member of claim 26, wherein at least some of said upper and lower out of plane truss units are pyramidal.

30. The multifunctional member of claim 29, wherein at least one of said active core members is a square or rectangular cellular sheet.

31. The multifunctional member of claim 26, wherein said deformed active core member is deformed in a substantially lateral direction or lateral direction.

32. A multifunctional member adapted for structural deformation in response to an impact or crushing force and reformation upon removal of said impact or crushing force, the multifunctional member comprising:

at least one active core member, said active core member adapted to deform if exposed to said impact or crushing force, and reform from a deformed state if exposed to a stimulant upon removal of said impact or crushing force;

at least one upper exterior member disposed on said core member; and at least one lower exterior member disposed on said core member opposite said upper exterior member, wherein at least a portion of said at least one upper exterior member and at least a portion of said at least one lower member interpenetrate one another when subject to the force.

33. A multifunctional member adapted for structural deformation and reformation, the multifunctional member comprising:

at least one active core member, said active core member adapted to deform in tension if exposed to an external force, and reform from a deformed state if exposed to a stimulant;

at least one upper expandable layer disposed on said core member, said upper expandable layer comprising an array of out of expandable units, said upper expandable units having a base dimension as defined by the dimension substantially parallel to said active core member, and a height dimension as defined by the dimension substantially perpendicular to said active core member;

at least one lower expandable layer disposed on said active core member opposite said upper space filling layer, said lower expandable layer comprised of an array of expandable units, said lower expandable units having a base dimension as defined by the dimension substantially parallel to said active core member, and a height dimension as defined by the dimension substantially perpendicular to said active core member, and said upper and lower expandable layers are adapted whereby when subject to the force the base dimensions of at least some of the upper and lower expandable units increase thereby deforming the active core member in tension.

34. The multifunctional member of claim 33, wherein said upper and lower expandable layers is a corrugated strip, corrugated band, corrugated ribbon, or corrugated sheet.

35. The multifunctional member of claim 33, wherein said deformed active core member is deformed in a substantially lateral direction or lateral direction.

36. A multifunctional member adapted for structural deformation and reformation, the multifunctional member comprising:

at least one active core member, said active core member adapted to deform in tension if exposed to an external force, and reform from a deformed state if exposed to a stimulant;

at least one upper three-dimensional space filling layer disposed on said core member, said upper three-dimensional space filling layer comprised of an array of out of plane truss units, said upper truss units having a base dimension as defined by the dimension substantially parallel to said active core member, and a height dimension as defined by the dimension substantially perpendicular to said active core member;

at least one lower three-dimensional space filling layer disposed on said active core member opposite said upper space filling layer, said lower three-dimensional space filling layer comprised of an array of out of plane truss units, said lower truss units having a base dimension as defined by the dimension substantially parallel to said active core member, and a height dimension as defined by the dimension substantially perpendicular to said active core member, and said upper and lower three-dimensional space filling layers are adapted whereby when subject to the force the base dimensions of at least some of the upper and lower truss units increase thereby deforming the active core member in tension.

37. The multifunctional member of claim 36, wherein at least some of said upper and lower out of plane truss units are tetrahedral.

38. The multifunctional member of claim 37, wherein at least one of said active core members is a hexagonal cellular sheet.

39. The multifunctional member of claim 36, wherein at least some of said upper and lower out of plane truss units are pyramidal.

40. The multifunctional member of claim 39, wherein at least one of said active core members is a square or rectangular cellular sheet.

41. The multifunctional member of claim 36, wherein said deformed active core member is deformed in a substantially lateral direction or lateral direction.

* * * * *